US008676622B1

(12) United States Patent
Ward, Jr. et al.

(10) Patent No.: US 8,676,622 B1
(45) Date of Patent: Mar. 18, 2014

(54) JOB RESOURCE PLANNER FOR CLOUD COMPUTING ENVIRONMENTS

(75) Inventors: David John Ward, Jr., Seattle, WA (US); Geoffrey S. Pare, Seattle, WA (US); Brian Helfrich, Seattle, WA (US); David Nunnerley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/461,605

(22) Filed: May 1, 2012

(51) Int. Cl.
*G06Q 10/00* (2012.01)

(52) U.S. Cl.
USPC .......................................... 705/7.12; 705/7.11

(58) Field of Classification Search
USPC ................................................ 705/7.11, 7.12
See application file for complete search history.

(56) References Cited

U.S. PATENT DOCUMENTS

| | | | |
|---|---|---|---|
| 7,743,001 B1 | 6/2010 | Vermeulen et al. | |
| 7,870,044 B2 | 1/2011 | Robertson | |
| 8,055,493 B2 | 11/2011 | Rolia et al. | |
| 2003/0028642 A1 * | 2/2003 | Agarwal et al. | 709/226 |
| 2003/0229529 A1 * | 12/2003 | Mui et al. | 705/8 |
| 2006/0159014 A1 * | 7/2006 | Breiter et al. | 370/229 |
| 2007/0219837 A1 * | 9/2007 | Lu et al. | 705/8 |
| 2008/0080396 A1 | 4/2008 | Meijer et al. | |
| 2008/0103848 A1 * | 5/2008 | Santos et al. | 705/7 |
| 2009/0049114 A1 | 2/2009 | Faraj | |
| 2009/0182598 A1 * | 7/2009 | An et al. | 705/7 |
| 2009/0276771 A1 * | 11/2009 | Nickolov et al. | 717/177 |
| 2009/0300635 A1 | 12/2009 | Ferris | |
| 2010/0010657 A1 * | 1/2010 | Do et al. | 700/103 |
| 2010/0050172 A1 | 2/2010 | Ferris | |
| 2010/0131624 A1 | 5/2010 | Ferris | |
| 2010/0131649 A1 | 5/2010 | Ferris | |
| 2010/0217865 A1 | 8/2010 | Ferris | |
| 2010/0306379 A1 | 12/2010 | Ferris | |
| 2011/0119104 A1 | 5/2011 | Levine et al. | |
| 2011/0131335 A1 | 6/2011 | Spaltro et al. | |
| 2011/0137805 A1 | 6/2011 | Brookbanks et al. | |
| 2011/0138050 A1 | 6/2011 | Dawson et al. | |
| 2011/0138051 A1 | 6/2011 | Dawson et al. | |
| 2011/0145392 A1 | 6/2011 | Dawson et al. | |
| 2011/0161964 A1 | 6/2011 | Piazza et al. | |
| 2011/0173038 A1 | 7/2011 | Moon et al. | |

(Continued)

OTHER PUBLICATIONS

"Amazon EC2 Spot Instance," Amazon Web Services LLC, Downloaded Mar. 26, 2012, 11 pages.

(Continued)

*Primary Examiner* — Thomas Dixon
*Assistant Examiner* — Gerald Vizvary
(74) *Attorney, Agent, or Firm* — Robert C. Kowert; Meyertons, Hood, Kivlin, Kowert & Goetzel, P.C.

(57) ABSTRACT

Methods and apparatus for a job resource planner for cloud computing environments are disclosed. A system includes a plurality of resource instances of a provider network, and a resource planner. The planner receives a plan request from a client, comprising a job goal and an indication of a resource acquisition policy to be used to obtain resource instances for the job. The policy specifies one or more instance data sources. The planner generates a resource acquisition plan for the job, based at least in part on an analysis of pricing data obtained from a specified data source. The analysis comprises one or more computation steps indicated in the policy. The generated plan includes at least one recommended acquisition price for a resource instance.

25 Claims, 11 Drawing Sheets

(56) References Cited

U.S. PATENT DOCUMENTS

| | | |
|---|---|---|
| 2011/0173626 A1 | 7/2011 | Chi et al. |
| 2011/0179132 A1 | 7/2011 | Mayo et al. |
| 2011/0202657 A1 | 8/2011 | Chang |
| 2011/0213691 A1 | 9/2011 | Ferris et al. |
| 2011/0213712 A1 | 9/2011 | Hadar et al. |
| 2011/0238458 A1 | 9/2011 | Purcell et al. |
| 2011/0295998 A1 | 12/2011 | Ferris |

OTHER PUBLICATIONS

"Amazon EC2 Instance Types," Amazon Web Services LLC, Downloaded Mar. 26, 2012, 5 pages.
"Amazon EC2 Reserved Instances," Amazon Web Services LLC, Downloaded Mar. 26, 2012, 6 pages.
"Amazon EC2 Instance Purchasing Options," Amazon Web Services LLC, Downloaded Mar. 26, 2012, 2 pages.
"Amazon EC2 Pricing," Amazon Web Services LLC, Downloaded Mar. 26, 2012, 8 pages.
U.S. Appl. No. 13/331,750, filed Dec. 20, 2011, Amazon Technologies, Inc., all pages.
U.S. Appl. No. 13/535,720, filed Jun. 28, 2012, Matthew D. Klein, et al.
U.S. Appl. No. 13/535,715, filed Jun. 28, 2012, Matthew D. Klein, et al.
U.S. Appl. No. 13/535,707, filed Jun. 28, 2012, Matthew D. Klein, et al.
U.S. Appl. No. 13/535,725, filed Jun. 28, 2012, Matthew D. Klein, et al.
AWS Documentation, "Using Cluster Instances," downloaded from docs.amazonwebservices.com/AWSEC2/latest/UserGuide/using_cluster_computing.html on May 16, 2012, pp. 1-6.
Amazon Web Services: AWS Products & Solutions, "High Performance Computing (HPC) on AWS," downloaded from aws.amazon.com/hpc-applications/ on May 16, 2012, pp. 1-3.
Timo Schneider (personal website), "An Oblivious Routing Congestion Simulator," downloaded from perlplexity.org/Research/ORCS/ on May 16, 2012, pp. 1-8.
U.S. Appl. No. 13/431,379, filed Mar. 27, 2012, David John Ward, Jr.
U.S. Appl. No. 13/431,388, filed Mar. 27, 2012, David John Ward, Jr., et al.
U.S. Appl. No. 13/429,957, filed Mar. 26, 2012, David John Ward, Jr., et al.
U.S. Appl. No. 13/431,355, filed Mar. 27, 2012, David John Ward, Jr.
U.S. Appl. No. 13/429,985, filed Mar. 26, 2012, David John Ward, Jr., et al.
U.S. Appl. No. 13/431,348, filed Mar. 27, 2012, David John Ward, Jr.
U.S. Appl. No. 13/431,360, filed Mar. 27, 2012, David John Ward, Jr.
U.S. Appl. No. 13/430,003, filed Mar. 26, 2012, David John Ward, Jr., et al.
U.S. Appl. No. 13/431,393, filed Mar. 27, 2012, David John Ward, Jr.
U.S. Appl. No. 13/475,399, filed May 18, 2012, David John Ward, Jr.
U.S. Appl. No. 13/475,359, filed May 18, 2012, David John Ward, Jr.
U.S. Appl. No. 13/476,828, filed May 21, 2012, David John Ward, Jr., et al.
U.S. Appl. No. 13/475,461, filed May 18, 2012, David John Ward, Jr., et al.

* cited by examiner

900

Resource Acquisition Policy Creation Page https://<website>.com/createRAPolicy

Dear John Doe, welcome to the resource acquisition policy creation page! ← 903

Please provide details for the policy you would like to create.

| | | |
|---|---|---|
| Policy name | [ ] | ← 907 |
| Policy description/goal | [ ] | ← 909 |
| Public data source(s) | Spot prices – last one month (default) | ← 911 |
| Private data source(s) (black-boxed) | None (default) | ← 913 |
| Aggregation function(s) for pricing data | Median value for instance size requested (default) | ← 914 |
| Analysis function/algorithm type | Scripted algebraic function (default) | ← 915 |
| Analysis function implementation | Script (upload here) (default) | ← 917 |
| Analysis external callback URL | None (default) | ← 919 |
| Time-varying recommended prices desired? | No (default) | ← 920 |
| Authorization/sharing settings | Private (not shared) (default) | ← 921 |
| Pricing for shared access | N.A. (default) | ← 923 |

[ Create this policy ] ← 991

*Figure 9*

Plan Request Page https://<website>.com/submitPlanRequest

Dear John Doe, welcome to the resource acquisition plan request page! ← 1003

Please provide details for the plan you would like us to generate.

| | | |
|---|---|---|
| Job name | [ ] | ← 1007 |
| Job description | [ ] | ← 1009 |
| Job resource requirements | One medium instance (default) | ← 1011 |
| Job high-level objectives | Minimize cost for specified runtime | ← 1012 |

Resource acquisition policy to be used (select one of the options, search for available policies, browse the policy marketplace, or create your own new policy)

- [x] MCSR1: Minimize-cost-for-specified-runtime ← 1013
- [ ] MI1: Minimize-interruption ← 1015
- [ ] SCTX: Average-spot-cost-times-X ← 1017
- [ ] User-specified (click here to specify) ← 1019

Enter search terms to search policy marketplace ← 1021

Click to browse policy marketplace ← 1023

[Submit plan request] ← 1091

*Figure 10*

JOB RESOURCE PLANNER FOR CLOUD COMPUTING ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of long-term resource reservations, customers may typically pay an upfront free for making the reservation, and in addition may have to pay usage-based fees for periods when the reserved resource is activated. Some resource acquisition modes may allow customers to bid for resources in a marketplace where resource price varies dynamically (e.g., on a minute-by-minute basis or an hour-by-hour basis) depending on supply and demand. Thus, a number of different pricing options may be available to a customer to obtain and use a resource of a given performance capability supporting a desired set of functionality. In some cases the large set of options and possible acquisition strategies available, especially for dynamically-priced resources, may become complex enough that some customers may tend to sometimes make suboptimal choices.

BRIEF DESCRIPTION OF THE DRAWINGS

FIG. 9 illustrates a portion of an example web-based interface that may be implemented to allow clients to request creation of resource acquisition policies, according to some embodiments.

FIG. 10 illustrates a portion of an example web-based interface that may be implemented to allow clients to submit a plan request for a job, according to some embodiments.

Figure 1:
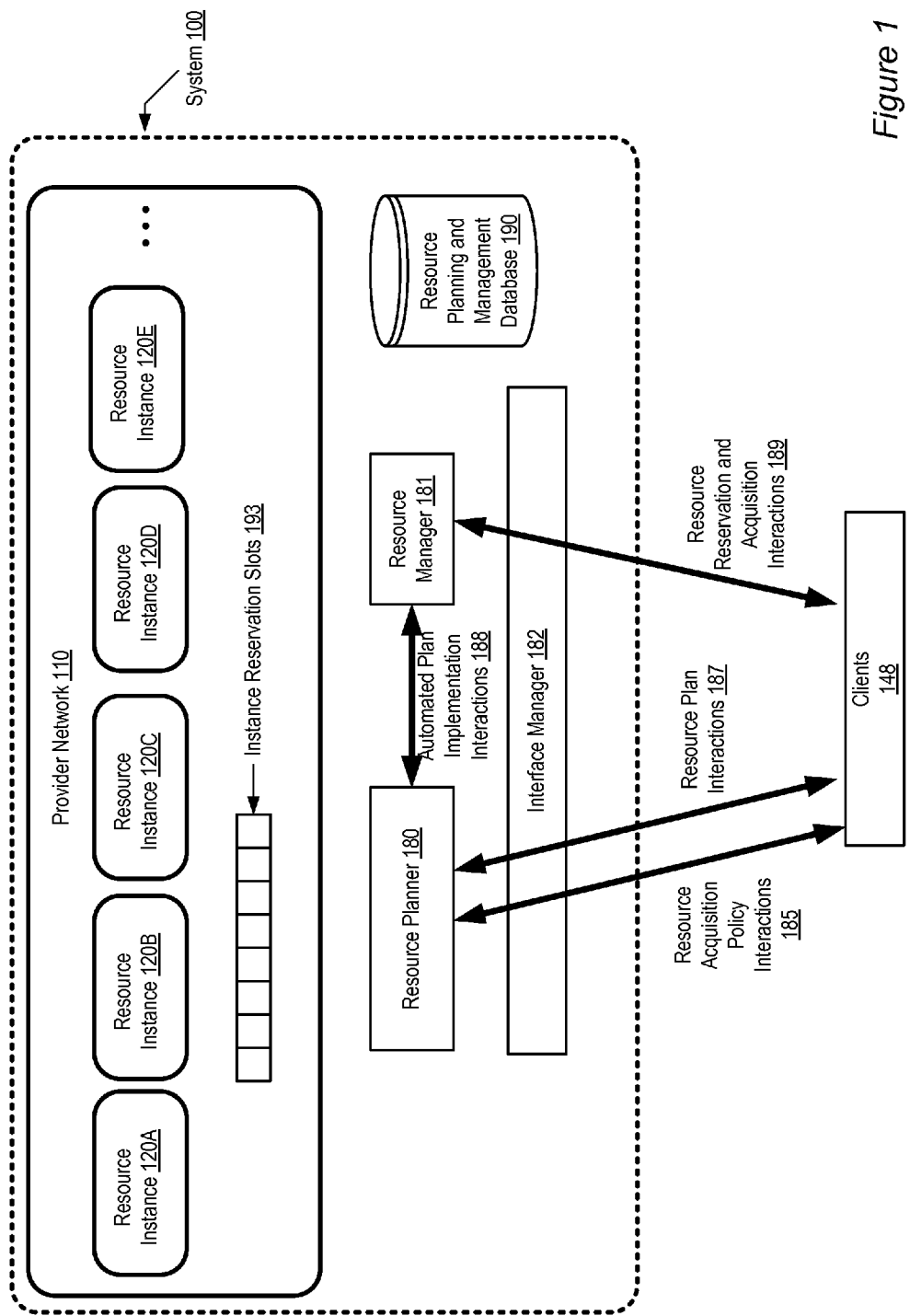
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for job resource planners for cloud computing environments are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resources, such as collections of physical and/or virtualized computer servers, storage devices, networking equipment and the like, needed to implement and distribute the infrastructure and services offered by the provider. The resources may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may in some instances implement a flexible set of resource reservation, control and access interfaces for their clients. For example, an interface manager of the provider network may implement a programmatic interface (e.g., via a web site, a set of web pages, or one or more application programming interfaces (APIs)) that allows clients to learn about, select, purchase access to, and/or reserve resource instances. Such an interface may include capabilities to allow browsing of a resource catalog, provide details and specifications of the different types or sizes of resources supported, the different reservation types or modes supported, pricing models, and so on. The requests received via the interface or interfaces may be handled by a resource manager, and the responses to the requests may be transmitted via one or more of the interfaces back to the requesting client. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client wishes to activate one or more instances that were previously reserved but had not yet been activated, or to a client that is willing to pay a higher spot price. In addition to long-term reserved instances, on-demand instances and spot instances, other purchasing modes or combinations of modes may be implemented by the resource manager in some embodiments.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster). Some clients may wish to specify the locations at which their resources are reserved and/or instantiated, e.g., at either the region level, the availability zone level, or a data center level, to maintain a desired degree of control of exactly where various components of their applications are run. Other clients may be less interested in the exact location where their resources are reserved or instantiated, as long as the resources meet the client requirements, e.g., for performance, high availability, supported software levels, and so on.

Choices may thus be available to clients or potential clients regarding the number and types of instances to be acquired for a particular computing job or task, the purchasing modes to be used to acquire the instances, the prices to be paid or bid for the instances, the location (e.g., the particular availability zone) where the instances are to be acquired, and so on. In order to make it easier for clients to make the most appropriate resource choices for their jobs, in some embodiments a resource planner may be implemented. The resource planner may be responsible for responding to plan requests from clients specifying job characteristics or goals. In accordance with one or more resource acquisition policies specified by the clients for their jobs, the resource planner may in some embodiments generate resource acquisition plans for the jobs, indicating various recommended actions to be taken to complete the jobs, such as for example recommended acquisition prices to be offered to acquire various instances needed for the jobs. A resource acquisition policy may include, in some embodiments, a specification of one or more data sources (such as instance pricing data sources for historical pricing data to be used in generating the plan) and/or one or more computation steps or algorithms to be used on data obtained from the data sources to determine recommended instance acquisition prices. The computation steps themselves may be specified by the clients in some implementations. In some embodiments, the resource planner may also provide a number of services regarding the creation, modification, and/or persistent storage of the resource acquisition policies themselves, as described below in further detail.

The types and values of recommended instance acquisition prices recommended by the resource planner may depend on the various purchasing modes supported by the resource manager. For example, in one embodiment, the recommendations in a given resource acquisition plan generated by the resource planner may include any appropriate combination of spot-market bid amounts, up-front or usage-based payments for resource instance reservations, payments for on-demand instances, and the like, to be used for one or more instances needed for the job. In some embodiments, an interface manager associated with or incorporated within the resource planner (which may be the same interface manager used for the resource manager, or a different interface manager specific to the resource planner) may provide programmatic interfaces for clients to specify the data sources and/or the computation steps or algorithms to be used to generate the plans.

The resource planner may store representations of resource acquisition policies in a persistent store or repository in some embodiments. In one embodiment the resource planner may implement a number of template or default resource acquisition policies, which may be used as-is (i.e., without modification) on client request, or may be modified/customized by various clients. Modified or customized versions of resource acquisition plans may also be stored in the repository in some implementations, and may be sharable by multiple clients in accordance with a set of associated authorization settings associated with (and/or stored with) the resource acquisition policies. Authorization information for a given resource acquisition policy may include, for example, identification of one or more entities (e.g., billable account identifiers, user identifiers, or group identifiers) authorized to access the resource acquisition policy, and one or more access permissions (e.g., read or modify permissions) granted to each entity. In some embodiments, the resource planner may implement a marketplace of resource acquisition plans, in which a variety of different plans (some generated entirely by the resource planner, and some generated by clients willing to share their policies) may be made available for use by different clients, potentially with a respective price associated with each policy. The policies available in such a marketplace may differ from each other in the combinations of instance data sources they use, the types of algorithms they use to determine recommended prices, the prices for using the plans, their relative success in achieving job goals, and so on. Clients provided access to such a marketplace may thereby benefit from the accumulated experiences of other clients that have previously used the policies included in the marketplace, and thereby avoid problems like overbidding for spot resource instances.

In one embodiment, in addition to generating plans and providing policy management services such as those described above, a resource planner may also allow clients to opt-in for automated implementation of the plans. In accordance with an automation opt-in request, for example, the resource planner may submit requests to acquire or obtain various resource instances in accordance with the recommendations of a plan as approved by the client, instead of the client having to submit the requests.

A number of different types of instance data sources may be available for resource acquisition policies in some embodiments. For example, the resource planner may allow clients to use pricing histories for various types of resource instances in various availability zones, including spot-priced instances, reserved instances and on-demand instances. In addition to the raw pricing data, a data source specification may include various aggregation functions (such as obtaining the average, median, variance, standard deviation, or 95th percentile value) to be applied to the data, time periods for which the data is to be collected, the time intervals between data collections (e.g., whether prices are to be sampled every hour or once every day), and so on. Some data sources may provide additional types of data (i.e., not just pricing data), such as various resource usage/acquisition metrics. For example, one data source may provide measures of the number of bids received for instances of a particular type, the absolute or relative number of on-demand instance requests and/or long-term reservations, and so on, which may also be useful in determining appropriate plans for a given job. Other data sources may provide information about how often various types of spot instances were interrupted (i.e., how often access to spot instances was revoked before the client using the spot instance voluntarily gave up the instance), the average runtimes of instances before they were interrupted, and so on. In some cases the resource planner may have access to private/confidential/proprietary data sources (such as the CPU speeds of various types of hardware servers being used for resource instances) whose data is not to be exposed directly or in raw form to clients, as well as public data sources freely accessible by clients. In some cases, data from the confidential sources may be made available in pre-aggregated or "black-box" formats such that the clients can obtain some values usable for plan generation (such as relative speeds of different instance types) without having access to underlying privileged or confidential information. In one embodiment the raw data or aggregated data produced by the various data sources may be stored at least temporarily in a resource management database, from which it may be retrieved by the resource planner as needed.

In some embodiments, a number of different types of computation steps, algorithms or functions may be specified as part of the resource acquisition policies. For example, clients may be allowed to provide or select algebraic or polynomial functions to be used on the raw or aggregated data from the specified data sources to determine recommended prices. In one example scenario, for example, three values S, R, and O may be obtained from data sources, respectively representing the average spot-market price, reserved-instance price and on-demand instance price over the last month at a particular availability zone for a particular instance performance capability level. The price P to be bid for a spot instance may be determined, based on a formula specified by a client as part of a resource acquisition policy, as "if (O>R) {P=1.25*S+(O−R)/10} else {P=O*1.25}". In some embodiments clients may provide program code (e.g., using a compiled or interpreted programming language or script) to implement the desired computation steps. In one embodiment, a client may be allowed to specify an external computation agent whose implementation details may be kept confidential by the client—e.g., the client may specify that data from a set of specified data sources be submitted in a specified format to a callback universal resource locator (URL) or service implemented outside the provider network, and the callback URL or service is to compute and/or provide the recommended acquisition prices or other plan outputs. Such an external computation agent may for example be implemented on client premises using proprietary algorithms developed by the client.

In some embodiments the client may specify various job goals, objectives or characteristics to be considered when generating a job plan: for example, one client may specify that the primary objective is to spend as little as possible while accumulating at least a specified amount of runtime for a job, another client's primary objective may be to minimize the number of times the job is interrupted (e.g., as a result of spot-price fluctuation), while another client may care more about completing a job by a desired time than achieving the minimum possible cost. Other job characteristics specified by clients may include for example the minimum CPU, memory, disk I/O and/or network performance requirements, the expected duration of the job, the locations (e.g., storage device addresses or destination URLs) to which job output is to be stored, and so on. In some cases the value of the job to the client may increase as the job proceeds and the client may specify this to the resource planner in the plan request, allowing the resource planner to generate time-varying recommendations (e.g., the planner may recommend several distinct bid price gradually increasing over time, so that the probability that the job is allowed to run to completion increases correspondingly). The resource planner may use the various job objectives and characteristics provided by the client to generate its recommendations.

Example System Environment

FIG. 1 illustrates an example system environment, according to at least some embodiments. The system 100 includes a provider network 110 with a plurality of resource instances 120, including resource instances 120A, 120B, 120C, 120D and 120E, a resource planner 180, a resource manager 181, and an interface manager 182. In some embodiments the resource instances 120 may be organized into a plurality of pools (not shown explicitly in FIG. 1), with each pool being dedicated to provide a particular type of instance, such as a pool for spot-priced instances, a pool for on-demand instances and a pool for reserved instances. Furthermore, in some embodiments, the provider network may be divided into location-based groups of instances such as regions, availability zones, and/or individual data centers; for clarity, such geographical partitions are also not shown in FIG. 1. Instance reservation slots 193 may be used as logical representations of long-term resource instance reservations in some embodiments, e.g., details about each reserved instance such as the term of the reservation and the current state of the reserved instance (e.g., active vs. inactive) may be kept in a respective slot 193.

In system 100, resource planner 180 may be responsible for implementing various services and operations related to resource acquisition policies and plans, while resource manager 181 may be responsible for implementing various resource reservation and acquisition actions. As shown by the arrows labeled 185, 186 and 187, respectively, interface manager 182 in the illustrated embodiment may be responsible for providing one or more programmatic interfaces (e.g., application programming interfaces or APIs, web pages, command-line interfaces and/or graphical user interfaces) for three types of client interactions: resource acquisition policy interactions between clients 148 and the resource planner 180 (arrow 185), resource plan interactions between clients 148 and the resource planner 180 (arrow 186) and resource reservation and acquisition interactions between clients 148 and the resource manager 181. In embodiments where the clients 149 may opt-in for automated implementation of plans generated by resource planner 180, the resource planner may interact directly with the resource manager on behalf of clients (as indicated by the arrow labeled 188), e.g., to place recommended bids for resource instances in the spot market, to make reservations or acquire on-demand instances, and so on. Persistent representations of resource acquisition policies and plans, as well as various other resource management related data entities used by the resource manager 181, may be stored in a persistent store such as resource planning and management database 190 in some embodiments. It is noted that although the resource planner 180, resource manager 181 and interface manager 182 are shown as independent entities in the illustrated embodiment, the functionality of these components may be accomplished using different component architectures in other embodiments. For example, in one embodiment the resource planner 180 may be implemented as a subcomponent of the resource manager 181; in another embodiment interface manager subcomponents 182 may be included within the resource planner and/or the resource manager, and so on. In yet another embodiment one persistent repository may be maintained for data objects typically handled by the resource planner 180 (e.g., representations of resource acquisition policies and plans), while a different repository may be used for data objects typically handled by the resource manager (e.g., reservations, resource instance state information, and so on.)

In some embodiments, the resource planner 180 may be operable to receive a plan request from a client 148, indicating one or more goals, objectives or requirements for a job, as well as a resource acquisition policy to be used to obtain resource instances 120 for the job. In response, the resource planner 180 may generate a resource acquisition plan, including at least one recommended acquisition price for a resource instance, based on several factors such as an analysis of pricing data obtained from a specified instance data source. Depending on the nature and complexity of the job, multiple recommended acquisition prices, e.g., some for spot-priced instances and some for on-demand or reserved instances, may be included in the plan. The analysis may include computation steps indicated in the resource acquisition policy. The job specified in the plan request may include any desired set of operations implementable using resource instances: for example, one job may include running a scientific simulation program on some set of input data, another job may include running a web server for a specified time period, a third job may simply include the availability of a desired operating system for a variety or combination of client-initiated tasks, and so on. Various types of job requirements may be specified in some implementations, such as a requirement for a minimum CPU speed, memory size, disk I/O operations throughput or networking throughput. In addition, in some implementations job planning goals or objectives may also be specified in plan requests, such as a desire to minimize costs for completing the job while obtaining at least a desired amount of CPU runtime (expressed in units such as CPU-minutes), or a goal of minimizing interruptions caused by revocation of access to the instances being used, or a goal of processing at least a specified input data set size within a specified time period.

A resource acquisition policy may be specified in the plan request in some embodiments, e.g., by name or by identifier, using a programmatic interface provided by the interface manager 182. Each resource acquisition plan may include an indication or specification of one or more data sources to be used for generating the desired plan, and a set of computation steps, functions or algorithms to be applied to the data obtained from the data sources to determine one or more recommendations of the plan. A data source specification may in some implementations include a data source name or identification information (e.g., "spot pricing history for small instances in availability zone X"), as well as various auxiliary information such as a time period over which the data is to be gathered (e.g., "the last 30 days"), the sampling frequency for the data (e.g., "once every hour"), and aggregation functions that may be applied to the raw data (e.g., "average" or "median", or "peak" or "$95^{th}$ percentile of the peak"), and so on. In some embodiments the resource planner may allow the client to choose from among a pre-defined set of available data sources, while in other embodiments the client 148 may choose to request additional data sources (e.g., based on various combinations of the data sources made accessible by the resource planner and one or more data sources indicated by the client). In some embodiments, the raw data or aggregated data generated by various data sources may be stored at least temporarily in various containers within the resource management database 190, from which it may be retrieved by the resource planner 180 as needed.

Several different ways of specifying the computation steps to be performed on the raw or aggregated data obtained from the data sources may be implemented in different embodiments. For example, in one embodiment the output data from the data sources may be represented as variable names, and the client may be allowed to specify algebraic or other mathematical functions or formulas using the variables, using one of the provided programmatic interfaces. In another embodiment the client 148 may be allowed to choose a programming or scripting language from among a set of supported languages to use to specify the computational steps; e.g., using industry-standard programming languages like C, C++, Java and the like, scripting languages such as Python, Perl, Ruby and the like, extensions of such industry-standard languages, and/or custom or proprietary policy specification languages implemented by the resource planner 180. Representations of the computation steps (e.g., scripts that can be interpreted, source code that can be compiled, byte code, or object code, etc.) may be stored at the client's request in the resource planning database 190 in some embodiments, and may be pointed to or referenced in the plan request. In other embodiments clients 148 may be allowed to include the computational steps (e.g., a script or source code fragment) in the plan request itself. In one embodiment, clients may be allowed to specify external computation step executors, such as a network-accessible service accessible via a callback URL. Using such an approach, for example, a client could request that data obtained from the specified data source(s) be packaged in some desired format (e.g., as plain text or as an encrypted object) and supplied to the callback URL or other external interface. The external computation executor or agent would then apply the client's desired algorithms or computational steps on the data and generate output (such as a recommended resource acquisition price or bid) for the requested plan.

In some implementations the resource planner 180 may provide a set of default policies from which the client may choose one or more to use. In other implementations clients 148 may create their own resource acquisition policies. A number of different approaches may be used for creating, storing and specifying user-generated resource acquisition policies in different embodiments. In one implementation, clients 148 may be given modify access permissions to customize the default resource acquisition policies provided by the resource planner 180, and the modified versions may be stored in the resource planning database 190 at the client's request. When the client wishes to use one of the modified policies for a plan request, the name or identifier of the customized policy may be specified in such scenarios. In another embodiment, a format or standard for specifying resource acquisition policies (using for example the extensible markup language (XML) or Javascript object notation (JSON)) may be advertised by the resource planner, and clients 148 may include a representation of the desired policy in the appropriate format with their plan requests.

A number of different types of specific recommendations may be included in the plan generated by the resource planner in some embodiments. For example, with regard to resource instance acquisition, the plan may include price recommendations for various types of resources and corresponding pricing methods for the job (e.g., the equivalent of "place a bid of $A per hour on the spot market for a medium instance", or "obtain a medium on-demand instance for $B per hour" or "reserve a large instance for one year for $C upfront and $D per hour of actual usage"), timing recommendations as to when the suggested actions should be taken, availability zone or other location recommendations, and so on.

As mentioned earlier, the resource planner may store representations of the resource acquisition policies in a persistent repository such as database 190 in some embodiments. In addition to the data sources and computational steps, representations of authorization settings associated with the resource acquisition policies may also be stored or maintained in some implementations. An authorization setting may indicate, for example, which entities (e.g., client accounts, specific users or groups of users) that are allowed to access the policy, and the types of actions (e.g., read, modify, store) that each authorized user is allowed to perform on a policy. The authorization setting of a policy may govern whether and to what extent the policy may be reused by different clients—for example, one client C1 may wish to restrict the use of its resource acquisition policies to a small set of users, while another client C2 may wish to make its policies freely available for use by anyone. In some embodiments, the resource planner 180 may implement a marketplace for different client-generated (and/or planner-generated) resource acquisition policies, allowing clients to browse, search for, bid on and/or pay for the use of policies with the combination of properties desired by the clients. In one marketplace implementation, various metrics of successful use of a particular policy may be made available for viewing by potential clients—e.g., one client C3 that wishes to sell a policy P1 designed to reduce the number of interruptions may advertise the low interruption rate achieved in practice by users of that policy, another client C4 that wishes to sell a policy designed to lower overall cost may advertise the total cost savings relative to on-demand or reserved instances achieved, and so on.

In one embodiment, in addition to simply generating resource acquisition plans, the resource planner 180 may, in response to an opt-in indication for automated plan implementation, take various resource acquisition actions on behalf of the client. Thus, in one such embodiment, instead of just advising the client that a spot-market bid for $K is appropriate at time T, the resource planner 180 may in fact place such a bid with the resource manager 180 at time T, thus saving the client the effort of placing the bid. In some embodiments, representations of the plans themselves may be stored in persistent repositories such as database 190, e.g., for later review or re-use. Further details and examples of the functionality of the resource planner 180 and the interface manager 182 are provided below.

Resource Instances Categories and Associated Pricing Models

Figure 2A:
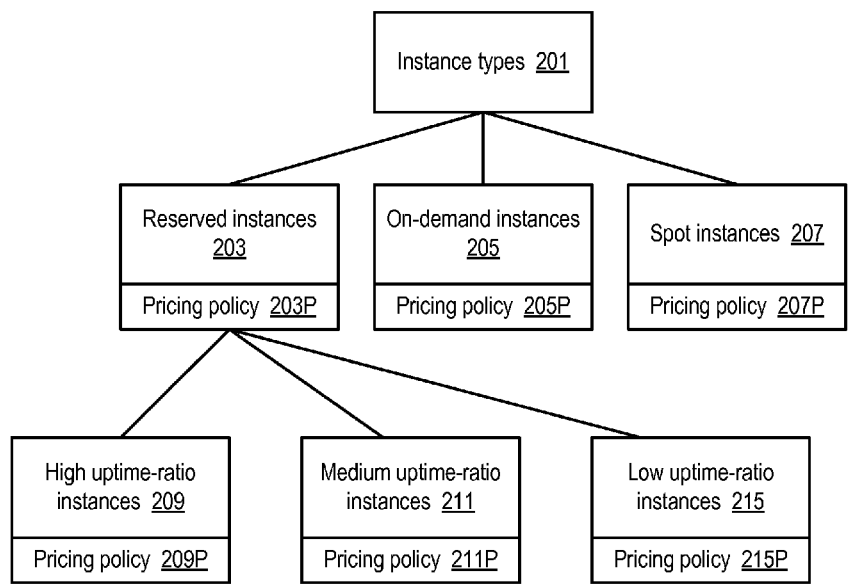
FIGS. 2a and 2b illustrate example resource instance classification approaches, according to at least some embodiments.
Figure 2B:
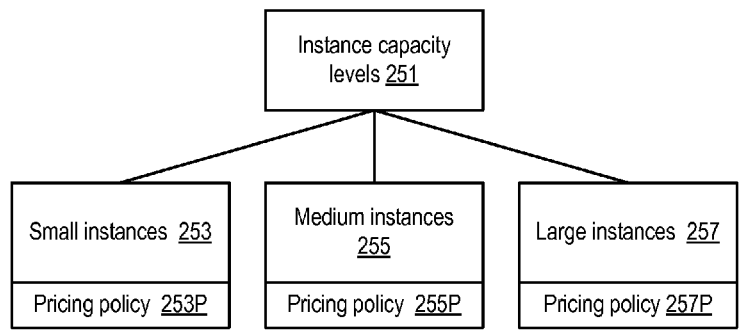

The resource instances 120 of a provider network 110 may be grouped into classes or categories based on several different dimensions in some embodiments, and the pricing policies associated with different classes may differ. FIGS. 2a and 2b illustrate example resource instance classification approaches, according to at least some embodiments. FIG. 2a illustrates an approach in which instances are classified based in part on the timing or duration of instance allocations—i.e., on when instances are obtained by clients and when they are released by the clients. Three high-level types 201 of resource instances are shown: reserved instances 203, on-demand instances 205, and spot-instances 207, each with respective pricing policies 203P, 205P and 207P. In one embodiment, a client 148 may reserve an instance for fairly long periods, such as a one-year term or a three-year term in accordance with the pricing policy 203P, by paying a low, one-time, upfront payment for the instance, and then paying a low hourly rate for actual use of the instance at any desired times during the term of the reservation. Thus, the client 148 may, by making the long-term reservation, be assured that its reserved instance 203 will be available whenever it is needed.

If a client 148 does not wish to make a long-term reservation, the client may instead opt to use on-demand instances 205 (or spot instances 207). The pricing policy 205P for on-demand instances 205 may allow the client 148 to pay for resource capacity by the hour with no long-term commitment or upfront payments. The client 148 may decrease or increase the resource capacity used, based on application needs, and may only have to pay the hourly rate for the instances used. In some cases the per-hour pricing for on-demand instances may be higher than the hourly rate for reserved instances, because the relatively long durations of reservations may provides a more stable revenue stream to the operator of the provider network than the potentially more dynamic revenue stream provided by on-demand instances. Spot instances 207 may provide a third type of resource purchasing and allocation model. The spot pricing policy 207P may allow a client 148 to specify the maximum hourly price that the client is willing to pay, and the resource manager 180 may set a spot price for a given set of resource instances 130 dynamically based on the prices clients are willing to pay and on the number of instances available to support the spot model. If a client 148's bid meets or exceeds the current spot price, an instance may be allocated to the client. If the spot price rises beyond the bid of the client using a spot instance 207, access to the instance by the client may be revoked (e.g., the instance may be shut down).

The prices of reserved instances 203, on-demand instances 205, and spot instances 207 may also vary based on the availability zones or geographic regions in which the instances are located. The operator of provider network 110 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. Of course, the price for a given long-term reservation may typically remain unchanged once a client completes the reservation.

In some embodiments, reserved instances 203 may be further classified based on expected uptime ratios. The uptime ratio of a particular reserved instance may be defined as the ratio of the amount of time the instance is activated, to the total amount of time for which the instance is reserved. Uptime ratios may also be referred to as utilizations in some implementations. If a client 148 expects to use a reserved instance for a relatively small fraction of the time for which the instance is reserved (e.g., 30%-35% of a year-long reservation), the client may decide to reserve the instance as a Low Uptime Ratio instance 215, and pay a discounted hourly usage fee in accordance with the associated pricing policy 215P. If the client 148 expects to have a steady-state workload that requires an instance to be up most of the time, the client may reserve a High Uptime Ratio instance 211 and potentially pay an even lower hourly usage fee, although in some embodiments the hourly fee may be charged for the entire duration of the reservation, regardless of the actual number of hours of use, in accordance with pricing policy 211P. An option for Medium Uptime Ratio instances 213, with a corresponding pricing policy 213P, may be supported in some embodiments as well, where the upfront costs and the per-hour costs fall between the corresponding High Uptime Ratio and Low Uptime Ratio costs.

Instance pricing may also vary based on other factors. For example, in the case of compute instances, the performance capacities of different CPUs and other components of compute servers such as memory size may come into play. FIG. 2b shows an example classification of compute instances based on instance performance ratings or capacity levels 251. Large instances 253 may have more computing capacity than medium instances 255, which in turn may have more computing capacity than small instances 257. Accordingly, different pricing policies 253P, 255P and 257P may be implemented for the different sizes of instances. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be determined by networking capabilities and networking usage (e.g., number of megabytes of data transferred, and/or the distances over which network traffic is transmitted). Other classification dimensions and techniques, including extensions of the basic hierarchies shown in FIGS. 2a and 2b, may be implemented in other embodiments. Some or all of the pricing information may be stored in resource management database 190 in some embodiments, and may be indicated as an instance data source for a resource acquisition policy to be used by resource planner 180 to generate a plan for a client.

Example Interactions Between Clients and the Resource Planner

Figure 3A:
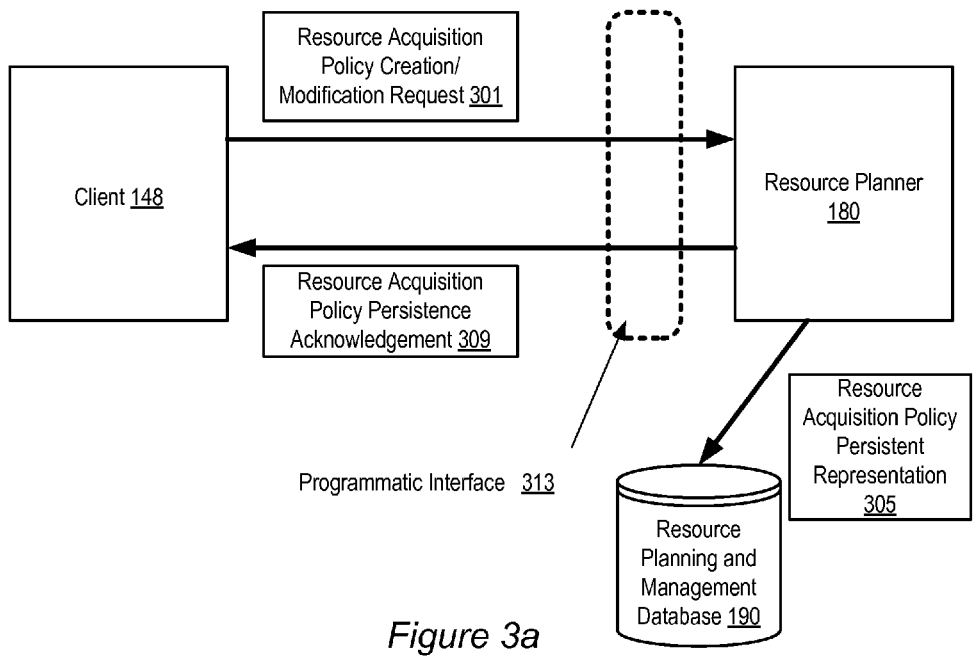
FIG. 3a illustrates example interactions associated with resource acquisition policies that may occur between clients and a resource planner, according to at least some embodiments.

FIG. 3a illustrates example interactions associated with resource acquisition policies that may occur between clients 148 and resource planner 180, according to at least some embodiments. As shown, a client may use a programmatic interface 313 (such as an API or a web page implemented by interface manager 182) to submit a resource acquisition policy creation/modification request 301 to the resource planner 180. The types of policy properties that may be modified or specified by a client 148 may vary in different implementations—for example, the types of computational steps that can be implemented for a given type of instance data source may be limited in some embodiments, and the resource planner may reject a policy creation or modification request 301 that violates such restrictions. Other properties, such as the name or description of the policy, may be generally modifiable with few restrictions.

Having received the policy creation/modification request 301, in some embodiments the resource planner 180 may validate the requested policy properties to be generated or changed. If the policy is found to be acceptable, the resource planner 180 may store a persistent representation 305 of the policy in a repository such as database 190 in some embodiments, and send an acknowledgement 309 indicating that the policy has been saved back to the client 148. The format in which the policy is expressed and/or saved may vary in different implementations. For example in one implementation the resource planner may advertise a standard syntax or format to clients 148 (e.g., using XML or a similar language), and any policy creation requests and modification requests may be parsed to ensure compliance with the standard. The format in which the policy representation is stored in a persistent repository may vary depending on the type of repository being used—e.g., a policy may be stored as a binary object column value in a relational database in some embodiments, or as a text/character column value in other embodiments.

Figure 3B:
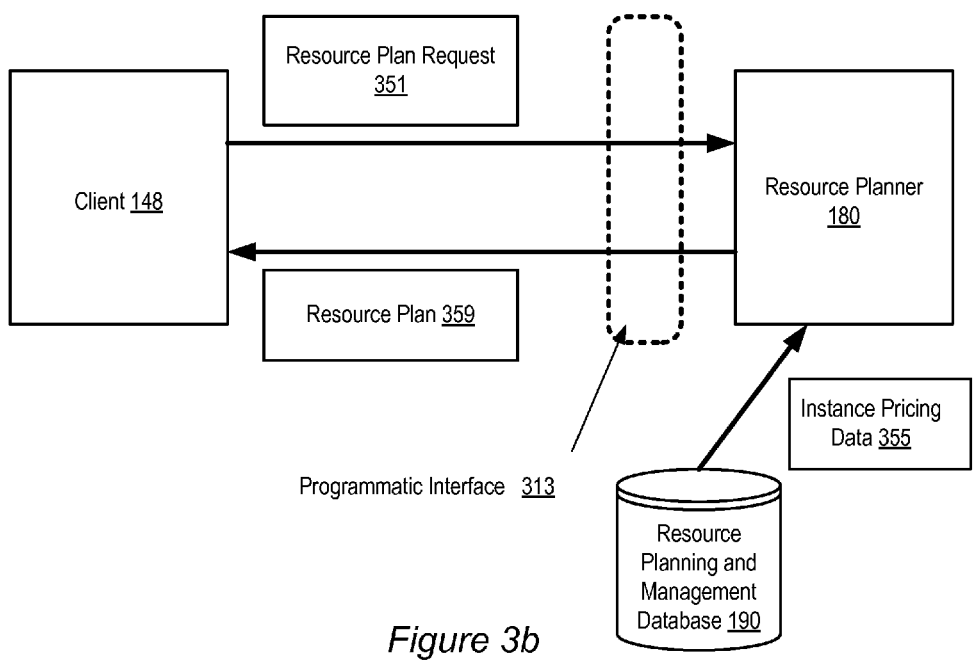
FIG. 3b illustrates example interactions associated with plan requests that may occur between clients and a resource planner, according to at least some embodiments.

FIG. 3b illustrates example interactions associated with plan requests that may occur between clients 148 and a resource planner 180, according to at least some embodiments. As shown, the client may send a resource plan request 351 to the resource planner 180. The plan request 351 may specify information on various instance data sources, as well as computations to be performed to generate the plan using data obtained from the data sources; further details on the constituent elements of plan requests 351 are provided below with reference to FIG. 4.

In response to the plan request 351, the resource planner may retrieve data from the data sources specified in the request. In the illustrated embodiment, for example, instance pricing data 355 for a one or more instance types may be retrieved from database 190; i.e., the database may also serve as a repository for historical pricing information for various types of instances in the illustrated embodiment. In other embodiments the resource planner may also or instead obtain instance data from other data sources, such as various metering agents or pricing/billing engines not shown in FIG. 3b. Using the data retrieved from the specified sources, and applying the computational steps specified in the policy indicated in the plan request 351, the resource planner may generate a resource acquisition plan 359 including at least one recommended instance acquisition price, and provide the plan 359 to the client 148. In some implementations a representation of the generated plan may itself be stored in a persistent repository such as database 190.

Example Constituent Elements of Plan Requests

Figure 4:
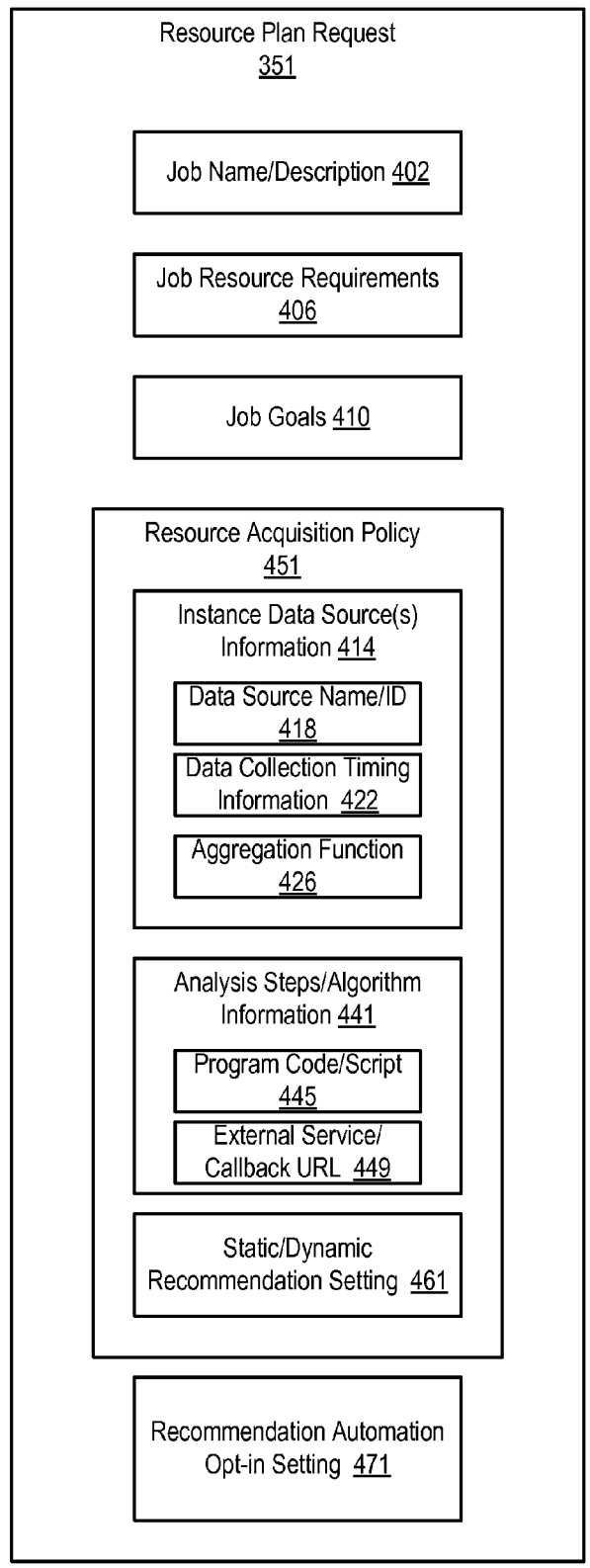
FIG. 4 illustrates example constituent elements of a resource plan request that may be submitted by a client to a resource planner, according to at least some embodiments.

FIG. 4 illustrates example constituent elements of a resource plan request 351 that may be submitted by a client 148 to resource planner 180, according to at least some embodiments. As shown, the resource plan request 351 may include several types of information about the job to be performed, such as job name and description 402, resource requirements 406 and job goals 410. Job resource requirements 406 may include, for example, an indication of the size or performance capabilities of the resource instance or instances that may be needed for the job. In some implementations the client 148 may explicitly specify, for example, the size of the instance needed (e.g., selected from the alternative instance sizes supported in the provider network, such as the small, medium and large instances illustrated in FIG. 2b), while in other implementations the resource requirements may be specified in terms of CPU speed, memory size, storage I/O operation rates or throughput, and/or network I/O rates or throughput. Other types of requirements, such as the operating system, middleware and/or application-level software requirements, may also be provided in job resource requirements 406 in some implementations. In one embodiment the estimated total time needed for completing the job may also be provided by the client 148, e.g., in units such as CPU-hours or CPU-minutes for compute-bound jobs. Job goals 410 may include indications of objectives to be prioritized when generating the requested plan. For example, goals 410 may indicate whether the client has a limited budget for the plan and wants costs minimized as long as the job eventually gets completed; or whether the client is willing to pay somewhat more to minimize interruptions to the execution of the job (such as might occur if a spot-price that is too low is offered); or whether the client is willing to pay more as the job progresses (e.g., if the value of completing the job from the point of view of the client increases as the job gets closer to completion).

In some embodiments the plan request 351 may include a resource acquisition policy 451 that specifies details of the instance data sources whose output is to be used to determine one or more instance pricing recommendations, as well as indication of the analysis steps or algorithms to be used on the instance data. Information 414 about the instance data source(s) may include data source names or identifiers 418 (e.g., "spot pricing data for instance size X"), data collection timing information 422 (e.g., whether for example pricing data collected over the last 15 days should be used in generating the plan, or the pricing data collected over the last 7 days should be used), and whether any aggregation function or functions 426 (e.g., maximum, average, median, $95^{th}$ percent of the peak value, etc.) should be applied to the raw instance data obtained from the data sources before applying the specified computational analysis or algorithm steps. In some implementations the data collection timing information may include the sampling frequency of the data—e.g., whether pricing data should be obtained at 1-hour intervals or 30-minute intervals.

The resource acquisition policy 451 may include analysis steps or algorithm information 441 in some embodiments, indicating how the raw or aggregated data from the specified data sources should be manipulated to obtain recommended acquisition prices such as spot-market bid values. The complexity of the algorithm or computational steps may vary widely for different resource acquisition policies in some embodiments: e.g., from simple algebraic functions to complex computations expressed in high-level programming languages. In one simple scenario, for example, the algorithm may simply multiply the average spot-market price for a resource instance by a factor of 1.5× to obtain a recommended bid value; in another more complex scenario, a sophisticated function may be used that estimates expected demand based on historical demand data, and estimates a bid price based on the estimated demand. In some embodiments an indication of the program code or script 445 to be used for the computation may be included in the resource acquisition policy 451, e.g., using an industry standard interpreted or compiled language, or a proprietary language.

As noted earlier, in some embodiments the resource planner 180 may allow clients 148 to use external computation agents or executors for the computation of recommended acquisition prices. Such capabilities may be especially useful to clients 148 that do not wish to expose the computations they wish to use to other clients or to provider network entities such as the resource planner, or clients that wish to combine data from client-proprietary data sources with data from the provider network's data sources, for example. A client in such an embodiment may specify an external callback URL or service 449 to which the data output from the data source(s) is transmitted, and from which recommended acquisition price(s) are received. Thus, the client 148 using an external computation executor/agent may obtain the benefit of access to pricing and other data from the provider network 110, while being able to avoid revealing details of the computations they wish to apply to the data to determine appropriate bid values for various resources, for example.

In some embodiments the plan request 351 may also include an indication 461 of whether the recommendations should be static or time-varying—e.g., in the case of spot-market bid values, whether the resource planner should provide a set of (bid-value, time at which to submit the bid) combinations, or whether a single static bid value for each resource instance is sufficient. Such time-varying recommendations may be useful in the cases where the value of the job increases as the job gets closer to completion, for example, or in cases where there are expected to be substantial fluctuations in instance prices during the lifetime of the job. In some implementations, the client may indicate, via an automation opt-in setting 471, that the recommended actions for the job should be initiated or performed by the resource planner, instead of the client having to initiate or perform the actions. In some implementations the client may opt in to automated implementation of the actions after first reviewing the recommendations—e.g., the opt-in agreement may be indicated in a subsequent step rather than in the plan request 351. Several variations of the automation opt-in feature may be implemented in different embodiments—for example, in some embodiments the client 148 may wish to be notified of the status of the job at designated intervals after an automated action is taken, so that client may take non-automated actions if desired. Similarly, if the plan generated by resource planner 180 in response to the plan request 351 comprises several recommended actions to be taken in sequence, the client may indicate that only a subset of the recommended actions should be automated, and that explicit approval should be obtained from the client before implementing other recommendations. It is noted that in some implementations, a respective pointer (e.g., a unique identifier) may be provided in the plan request 351 to specify the resource acquisition policy 451, the instance data source(s) 451, and/or the analysis steps 441, instead of explicitly listing the illustrated properties of the policy and its constituent elements.

Example Instance Pricing Data Usable for Plan Generation

Figure 5:
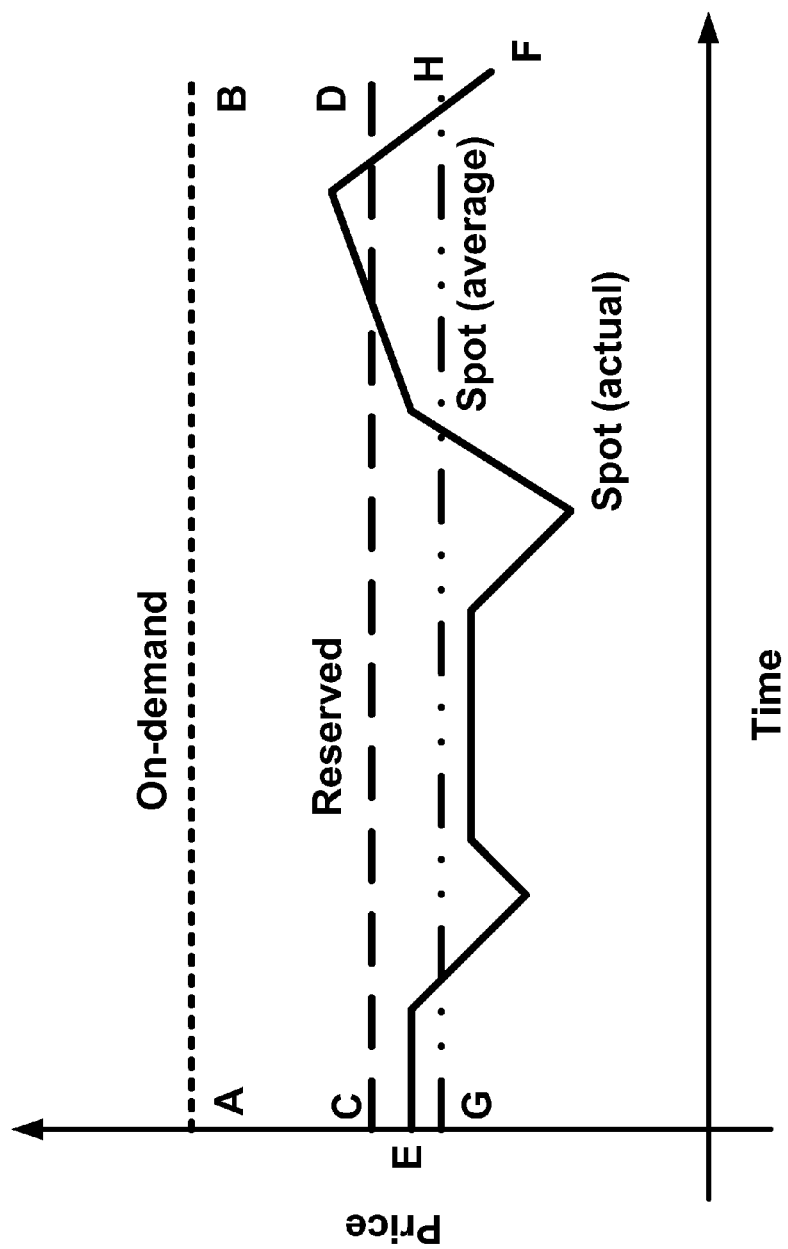
FIG. 5 illustrates an example of instance pricing variation data, which may be used to generate a recommended bid for an instance on the spot market, according to at least some embodiments.

FIG. 5 illustrates an example of instance pricing variation data over time, which may be used to generate a recommended bid for an instance on the spot market, according to at least some embodiments. In environments where spot markets are implemented, where the price for instances varies with supply and demand and also as a result varies with the bids submitted by other users of the market, the functionality provided by resource planner 180 may be extremely useful. In FIG. 5, the line segments labeled "Spot (actual)" between points E and F show an example of the variation in spot market prices for a particular instance type in a particular availability zone over a particular time period. The average spot market price over that period of time is indicated by the line between points G and H, labeled "Spot (average)". In addition, a constant price for on-demand instances (line AB) over the same time period, and a constant price for reserved instances (line CD) are also shown. It is noted that although, for simplicity, the prices for on-demand instances and reserved instances are shown as remaining unchanged over the depicted time range, in general the prices for various types of instances other than spot instances may also change over time. Furthermore, prices may vary based on uptime ratio (illustrated in FIG. 2*a*), availability zone, supported operating system or software stack, or other characteristics, as well, leading to substantially more complex pricing variation in practice than the simple example illustrated in FIG. 5.

In some implementations of spot markets, depending on the experience level and/or intent of clients 148 in making bids, inappropriate bids that can potentially distort the market may be made either inadvertently or maliciously. For example, in one implementation the actual price that a particular client C1 has to pay for a spot instance may be determined as the minimum of the bid B1 offered by C1, and a "global" spot price determined by a resource manager 181 based on the bids B2 . . . BN offered respectively by other clients C2 . . . CN. Looking at the spot price history example shown in FIG. 5 and based on C1's interpretation of how the spot market works, client C1 may make the following assumptions: (a) spot prices are typically lower than on-demand prices and usually lower than reserved instance prices; (b) if I make a high bid BH, such as 10× the average reserved instance price, then I am very likely going to be able to obtain a spot instance and retain access to it while paying an actual price that is much lower than BH (because the actual spot price depends on what others bid) and (c) if I make a bid that is much closer to the average spot price or reserved instance price, I may not get an instance if the spot price happens to rise. Based on this reasoning client C1 may be tempted to place the high bid BH, without expecting to actually have to pay as high a price as the bid. However, if for example the other spot market users happen to complete their jobs and leave the spot market while C1's job is still running, the spot market price may increase to BH, resulting in (a) C1's having to pay much more than expected and (b) other clients potentially not being able to obtain any instances at reasonable prices. Using the services of a resource planner 180 that allows selection of resource acquisition policies that have worked in the past and are based on extensive experience of other clients on the spot market may be especially helpful in avoiding these kinds of problems.

In some environments, clients that have experimented with various bidding strategies over time for different applications may have identified the types of input data and the types of computations to be performed on them to determine effective bid prices (e.g., whether on-demand prices should be factored in, and if so to what extent, when determining spot market prices). For example, clients whose jobs involve running web server programs may have learned that it is most effective to bid at a price halfway between the reserved instance price and the on-demand price, while clients that run interruptible and idempotent programs may have learned that it is sufficient to bid at a price roughly 10% higher than the average spot price over the last week. Since poor bids from other clients may affect the market negatively even for experienced clients, such clients may wish to encapsulate their bidding strategies into the resource acquisition policies made available by the resource planner 180 to other clients. In addition, the resource planner 180 may have access to the bidding histories and job interruption/completion histories of large numbers of spot market clients, and may be able to capture information about successful bidding strategies for different types of jobs and job objectives in some embodiments. Using this type of information, the resource planner 180 may be able to implement various default resource acquisition policies to allow relatively inexperienced clients to receive effective instance acquisition pricing recommendations.

Methods for Managing Resource Acquisition Policies and Plan Requests

Figure 6:
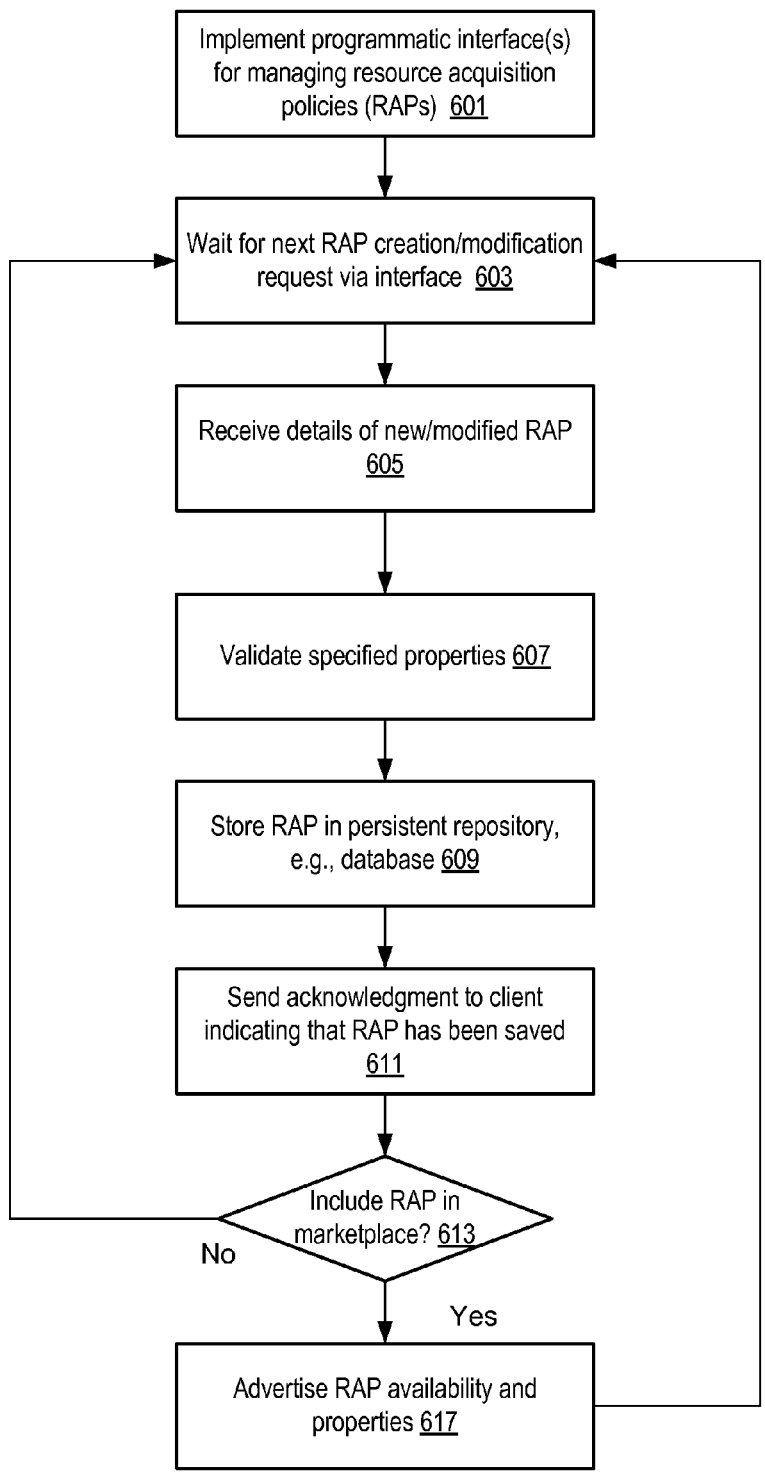
FIG. 6 is a flow diagram illustrating aspects of the functionality of a resource related to resource acquisition policies, according to at least some embodiments.

FIG. 6 is a flow diagram illustrating aspects of the functionality of a resource planner 180 related to resource acquisition policies, according to at least some embodiments. As shown in element 601, one or more programmatic interfaces (e.g., web pages, APIs, command-line interfaces, or graphical user interfaces) may be implemented for resource acquisition policy interactions. In some embodiments, at least some of the interfaces may be implemented by an interface manager 182 separate from the resource planner 180; in other embodiments the interfaces may be implemented by a subcomponent of the resource planner 180. The resource planner 180 may wait for the next resource acquisition policy creation or modification request (element 603).

As part of a request to create a new resource acquisition policy 451, the client 148 may specify details of the various elements of the policy such as details of the instance data source(s) to use, the computational steps or algorithms to use, and the authorization settings or access permissions to be applied to the newly created policy. In the case of a policy modification request, in some implementations only a subset of the constituent elements of a policy may be modifiable—e.g., for some policies, a change to the algorithm may be allowed, but not a change to the data sources. Having received the details of the policy to be created or the policy elements to be modified (element 605), the resource planner may in some embodiments validate the specified new properties (element 607). Several different types of validation operations may be implemented in different embodiments—e.g., authorization-related validation to ensure that the requesting client is allowed to create/modify the specified elements, consistency-related validation to ensure that the supplied algorithm steps make use of the specified data sources, checks to ensure that the algorithm is specified in a supported language, and so on. If the request passes the validation tests, the new or modified resource acquisition policy may be stored in a persistent repository such as a resource management and planning database 192 in some embodiments, as shown in element 609, and an acknowledgement that the policy has been saved may be sent to the client (element 611).

In some embodiments the resource planner may be responsible for implementing a resource acquisition policy marketplace allowing clients to share and/or sell various resource acquisition policies. If the client requested that the newly created or modified policy be included in such a marketplace (as determined in element 613), the resource planner may place the policy in the marketplace and make its properties (e.g., its description, data source(s), computational algorithm details, and/or price) accessible to potential users of the policy (element 617). If the client does not wish to include the policy in the marketplace (as also determined in element 613), or, after including the policy in the marketplace, the resource planner may resume waiting for the next policy creation/modification request. The resource planner 180 may also include a billing subcomponent in some embodiments configured to transfer the prices/fees paid by a buyer of a client-created resource acquisition policy to the client that created the policy and requested that it be included in the marketplace. Various pricing approaches may be implemented for the policies in the marketplace in different embodiments—e.g., a buyer may be charged a flat fee for access to a policy, a per-use fee may be charged every time the policy is used, and/or a fee may be charged for modification rights to a policy.

Figure 7:
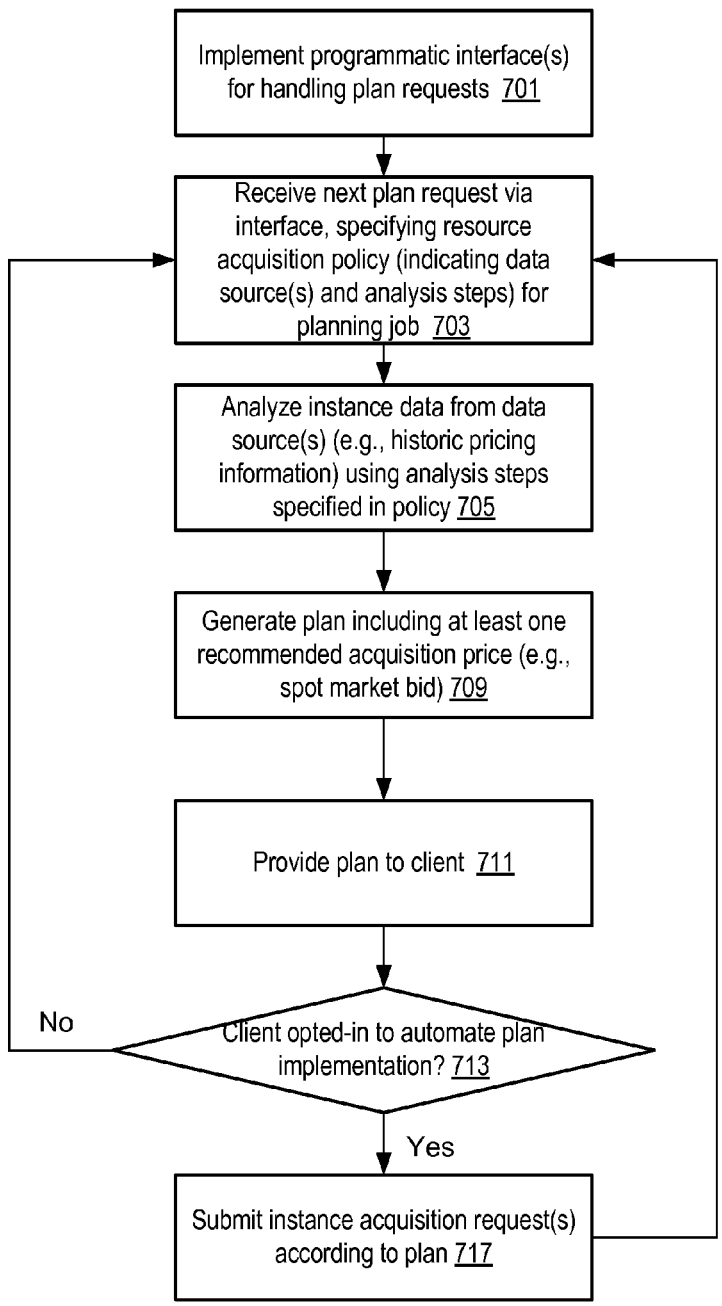
FIG. 7 is a flow diagram illustrating aspects of the functionality of a resource planner related to plan requests, according to at least some embodiments.

FIG. 7 is a flow diagram illustrating aspects of the functionality of a resource planner related to plan requests from clients 148, according to at least some embodiments. As indicated in element 701, one or more programmatic interfaces, such as APIs, web pages or command-line tools, may be implemented for receiving and responding to plan requests from clients. As in the case of interfaces indicated in FIG. 6, these interface(s) may be implemented by an interface manager subcomponent of the resource planner 180 in some embodiments, and by an independent interface manager 182 in other embodiments. The resource planner 182 may receive a plan request 351 for a job from a client 148, specifying a resource acquisition policy 451 to be used to generate a plan for the job (element 703). The resource acquisition policy 451 may include an indication of one or more instance data source (s) and one or more analysis or computation steps to be applied to data obtained from the instance data sources. Details regarding job resource requirements and/or objectives (such as a goal of minimizing overall cost for obtaining a specified amount of CPU execution time for the job, a goal of completing the job by a specified deadline, or a goal of minimizing interruptions to the job) may also be included in the plan request 351 in some embodiments, and may be used by the resource planner to determine its recommendations. The details of the data sources and analysis steps may be included within the plan request in some embodiments, and may be pointed to or referenced (e.g., using unique identifiers that can be used to look up the data sources or computation plans in a database 192) in other embodiments.

Based on the specified resource acquisition policy, the resource planner 180 may obtain the desired raw or aggregated data from the data source(s), such as, for example, the average spot price for a particular resource instance size. The data may then be analyzed in accordance with the computation steps specified in the policy (element 705). A resource acquisition plan may then be generated (element 709) using the results of the analysis, where the plan comprises at least one recommended instance acquisition price, such as a bid value for a spot instance. The plan may then be provided to the client (element 711).

In some embodiments the client 148 may be given the opportunity to request that the recommendations provided by the resource planner 180 be automated, i.e., that the resource planner implement the plan without further explicit approval from the client 148. In such an embodiment, if the client 148 opts in to the automated implementation of the recommendation (as determined in element 713 of FIG. 7), the resource planner may submit instance acquisition requests (e.g., spot instance bids) in accordance with the plan (element 717). In either case, i.e., whether automated implementation was requested or not, the resource planner may again wait for additional plan requests and handle them if/when they arrive. It is noted that the request for automation of recommendations may be made at several different possible levels in different implementations—e.g., the client may request automation at a global level for all its job plan requests, the client may specify automation requirements separately for each request, or a global automation opt-in setting that can be overridden for specific jobs may be implemented.

Figure 8:
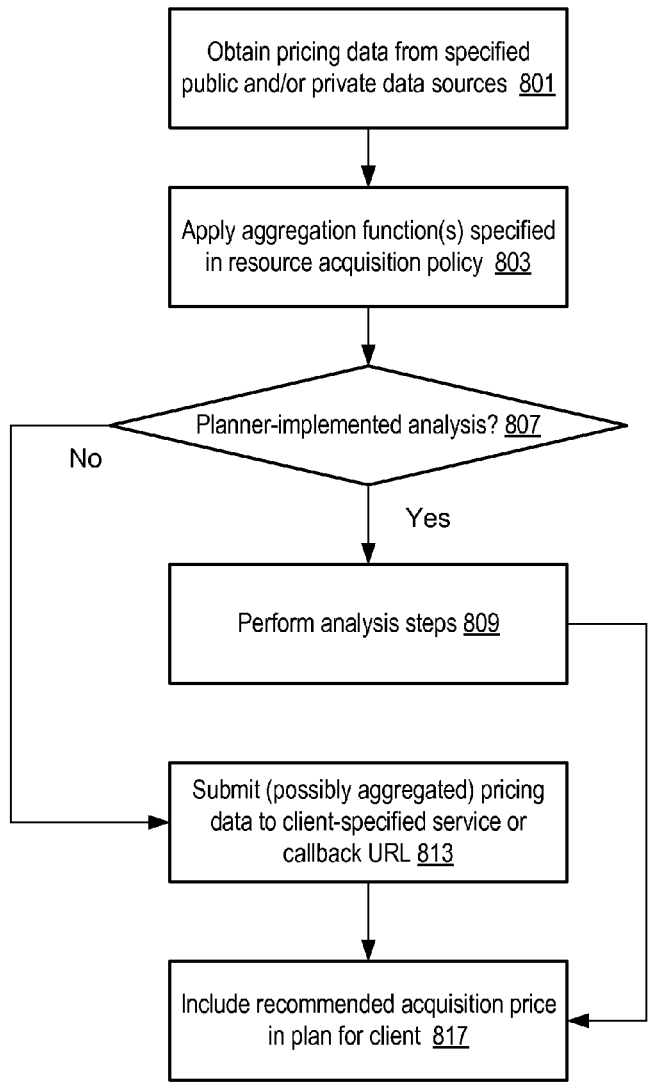
FIG. 8 is a flow diagram illustrating aspects of the functionality of a resource planner related to computation steps applied to data obtained from an instance data source, according to at least some embodiments.

FIG. 8 is a flow diagram illustrating aspects of the functionality of a resource planner 180 related to computation steps applied to data obtained from an instance data source, according to at least some embodiments. The functionality illustrated in FIG. 8 may provide further details/examples of, or overlap with, at least a portion of the functionality corresponding to element 705 of FIG. 7 for some embodiments. As part of its functionality of managing and pricing the various types of instances of the provider network 110, the resource manager 181 may have access to various different kinds of resource instance usage and pricing data. In some embodiments, a subset of this data (e.g., the actual spot price for instances of a particular size) may be made available to clients 148 in the form of public instance data sources, while the use of other portions of the data (such as details of exactly what fraction of the available capacity was in use at a given data center, or what server hardware was being used) may be restricted to administrative entities such as resource planner 180 within the provider network. The sources of the restricted data may be termed private instance data sources herein. In some embodiments, while direct access by clients 148 to the raw data from the private data sources may be prohibited, aggregated or summarized views of some private data may be made available—e.g., the client may be prohibited from learning the brands and CPU clock speeds of the servers in use at a data center, the relative processing power of different resource instance sizes may be made available to the client. In addition, in some embodiments the client 148 may be allowed to request that data obtained from private data sources be used by the resource planner 180 (which may be authorized to access private data sources) without the details of the private data being revealed to the client 148.

As shown in element 801 of FIG. 8, in the process of responding to a plan request, the resource planner may receive instance pricing data from one or more public and/or private instance data sources. If the resource acquisition plan to be used involves further aggregation functions, such as determining the average of several data points from the data sources, the resource planner may apply those aggregation functions (element 803). In some embodiments, as noted earlier, clients may specify external computation agents or executors to which the data is to be supplied, as opposed to the resource planner performing the computation steps indicated in the resource acquisition policy being used. If the analysis/computations are be performed entirely by the resource planner 180, as determined in element 807, the resource planner may perform the indicated computations (element 809) and obtain the recommended resource instance acquisition price(s) to be included in the plan (element 817) from the results of the computation. If at least some computation steps are to be performed externally at the client's request (as also determined in element 807), the resource planner may submit the possibly aggregated data obtained from the data sources in a specified format to one or more external services specified by the client, e.g., using a callback URL (element 813). The result of the external computation may in some implementations itself comprise one or more instance acquisition prices which can be included in the plan (element 817), or, in other implementations, the result of the external computation may be fed back into additional computation steps performed by the resource planner 180. In either case, whether some or all of the computation steps are performed externally or not, the resource planner may include one or more recommended instance acquisition prices obtained as a result of the computation in its plan generated for the client 148.

It is noted that the functions corresponding to the various elements shown in FIGS. 6, 7 and 8 may in some embodiments be performed in an order different than that shown. Furthermore, some of the operations illustrated in the flow diagram may be omitted in some implementations, or be performed in parallel with others of the illustrated operations.

Example Web-Based Interfaces for Resource Acquisition Policies and Plans

FIG. 9 illustrates a portion of an example web-based interface that may be implemented (e.g., by interface manager 182 or by a subcomponent of the resource planner 180) to allow clients 148 to submit requests to create resource acquisition policies, according to some embodiments. As shown, the interface may include a web page 900 that includes a message area 903 and a number of fields that may be filled by a client to provide specifications or preferences for a desired resource acquisition policy. Field 907 may be used by the client 148 to provide a name for the policy, and a description or goal of the policy may be entered via field 909. Information about instance data sources may be provided by fields 911, 913 and 914 in the illustrated example interface. Public data sources, which may include sources of instance usage or pricing—related data made available to clients and/or other entities external to the provider network 110 by resource manager 181 or resource planner 180, may be identified using field 911. Several different kinds of private data sources may be identified using a field similar to 913 in different implementations. For example, sources that comprise data collected within the provider network, but not exposed in raw form to clients, may be specified via such a field 913; the resource manager 181 or resource planner 180 may provide such data in "black-box" format where the client can only specify the type or name of the data source but cannot view the numerical data, or can only view a transformed or normalized form of the data. In some implementations, clients may be able to indicate client-owned or client-managed private sources of instance-related data—e.g., the rate at which database transactions of a certain type have been processed on a resource instance being used as a database server by the client, or even from a server being hosted on client premises. If any aggregation functions are to be applied to the data obtained from the public and/or private data sources, such as averaging the data or obtaining a $90^{th}$ percentile of the peak value, the aggregation functions may be specified using one or more fields similar to field 914. Aggregation functions may be specified separately for each data source in some implementations. In one implementation, in addition to specifying the data sources by name or by unique identifier, the client 148 may also provide a variable name (e.g., "avgSpotPrice" for a data source indicating the average spot price for a type of instance over a specified period) for each data source, such that the variable name may be used in the analysis function or algorithm. In some implementations the client may be allowed to select data sources using a drop-down or other menu interface.

Information about the analysis or computation steps to be performed on the data obtained from the data sources may be provided using fields 915, 917 and 919 in the example web interface of FIG. 9. The client 148 may specify the type of analysis function or algorithm to be used via field 915—e.g., where a simple algebraic function is to be used, a script or a program written in a compiled or interpreted programming language is to be used. The actual function, source code or script code may be specified using field 917—e.g., a script or program in text format, byte-code format, or compiled format may be uploaded (or, for simple functions, a formula may be entered manually). Any external callback URLs to be used may be indicated via field 919—e.g., the client may supply the HTTP or HTTPs address where the data obtained from the data sources is to be provided as input for the computation steps desired by the client. If the client wishes to obtain time-varying recommendations (e.g., potentially different bid values at different points of time) instead of static or one-time recommendations, such a preference may be indicated via field 920.

Authorization or sharing related settings for the policy to be created may be specified via field 921 in the illustrated embodiment. For example, a client 148 may wish to share the policy it is creating with a specified set of other clients, or with all clients of the provider network that have access to the resource planner. If the client creating the policy wishes to charge others for sharing the policy, an indication of the pricing may be provided via field 923. A number of different pricing approaches may be supported in different implementations—e.g., a single one-time charge, or a charge each time the policy is specified in a plan request. Button element 991 may be used to submit the information in the various fields to the resource planner 180 for saving the policy in a persistent store such as database 190. In some implementations a web page similar to web page 900 may be supported for modifying an existing resource acquisition policy.

FIG. 10 illustrates a portion of an example web-based interface that may be implemented to allow clients 148 to submit a plan request for a job, according to some embodiments. As shown, the interface may comprise a web page 1000 with a message area 1003 and a number of different field selectors for specifying various job and resource acquisition policy details. A job name may be provided by the client using field 1007, and a job description may be indicated in field 1009. Specific resource requirements (e.g., the size of a desired resource instance to be acquired for the job) may be indicated via field 1011. In some embodiments the client may be allowed to specify a high-level objective for the job, such as whether the client desires to prioritize cost minimization, minimize the number of interruptions to the job, completion of the job by a specified date, and so on, using a field 1012.

Information about the resource acquisition policy to be used may be specified by a set of fields or options shown in the lower half of the web page 1000. In the illustrated example, the client is provided with a choice of a number of pre-created or default policies with names indicative of their objectives, and also provided with search and browse interfaces to view available policies. By selecting option 1013, the client may choose a resource acquisition policy titled "MCSR1: Minimize cost for specified runtime", for example. Other existing policies available include "MI1: Minimize interruptions" (option 1015) and "SCTX: Average-spot-cost-times-X" (option 1017), in which the client may supply a multiplication factor X by which an average spot-market price is to be multiplied to arrive at a recommended spot bid value. If the client wishes to specify a new policy or a previously created policy that is not shown in web page 1000, the client may use element 1019. (Selecting element 1019 may result in the client eventually reaching a web page similar to that shown in FIG. 9 to specify a new policy in some implementations.) Search terms to look up policies in a policy repository (such as database 190) or marketplace may be specified via field 1021, and the repository or the policy marketplace may be browsed by clicking on a link in field 1023. Button 1091 may be used to submit the plan request in the illustrated embodiment to the resource planner 180.

It is noted that in some implementations, the elements of web pages 900 and 1000 illustrated in FIGS. 9 and 10 may be arranged differently, or may be organized into multiple web pages instead of being included within one web page. For many types of information to be specified, the resource planner 180 and/or the interface manager 182 may provide a restricted set of selectable options, e.g., via drop-downs or other web interface components in some embodiments. Default values for several fields may be specified in some implementations.

Example Use Cases

The techniques described above for supporting job plan requests and resource acquisition policies may be useful in a wide variety of environments. As the number of applications being deployed to cloud-based environments grows, the number of different types of resource instances supported, and the number of different types of applications supported, is likely to grow as well. While customers that have used cloud-based services for a while may have gained enough experience to make good decisions regarding the types of resources they should use and the prices they should pay for using them, there may be a growing set of newer, less experienced customers whose resource and pricing choices may not necessarily be optimal in the absence of recommendations from an entity similar to the resource planner.

The functionality described above may be particularly useful in environments where the resource acquisition choices (e.g., bid prices for spot-market resources) made by one client may potentially impact the overall market, for example by raising prices dramatically and unexpectedly. By providing a set of default policies that may cater to a majority of new clients' needs, the possibility of potentially disruptive resource acquisition attempts may be reduced. Furthermore, support for a marketplace of resource acquisition policies may allow experienced clients to benefit in at least two ways: by reducing the chances of market disruption (by inexperienced clients) which could affect their own applications and costs, and by monetizing their accumulated expertise regarding resource acquisition and bidding strategies.

Illustrative Computer System

Figure 11:
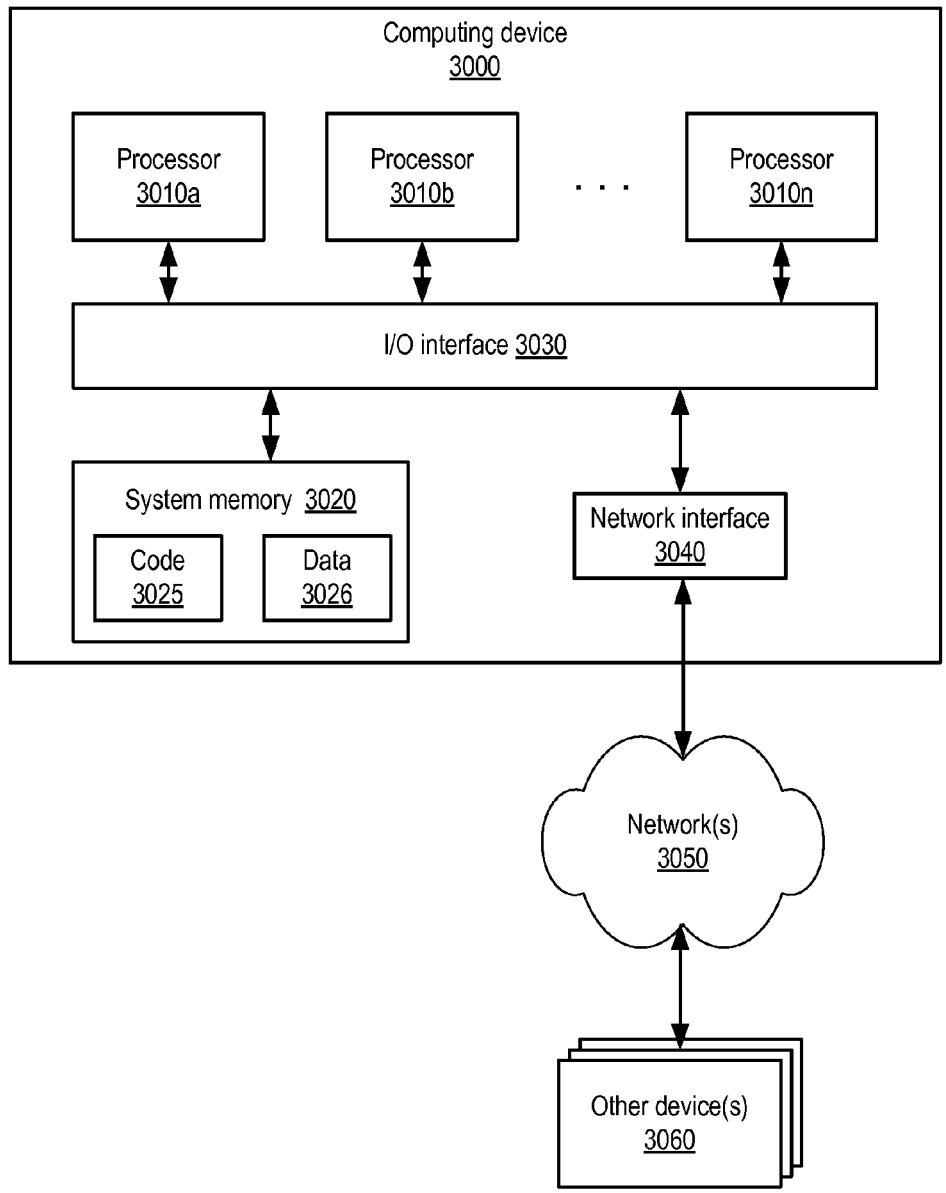
FIG. 11 is a block diagram illustrating an example computing device that may be used in some embodiments.

In at least some embodiments, a server that implements a portion or all of one or more of the technologies described herein, including the techniques to implement the functionality of resource planner 180, resource manager 181 and interface manager 182 may include a general-purpose computer system that includes or is configured to access one or more computer-accessible media. FIG. 11 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 10, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices configurable to implement a plurality of resource instances of a provider network; and
one or more computing devices configured to implement a resource planner;
wherein the resource planner is operable to:
receive a plan request from a client, wherein the plan request comprises one or more job goals and an indication of a resource acquisition policy to be used to obtain one or more resource instances of the plurality of resource instances to be used for the job, wherein the resource acquisition policy specifies one or more instance data sources; and
generate a resource acquisition plan in accordance with the plan request based at least in part on an analysis of pricing data obtained from an instance data source of the one or more instance data sources, wherein the analysis comprises one or more computation steps indicated in the resource acquisition policy, and wherein the resource acquisition plan comprises at least one recommended acquisition price for a resource instance of the plurality of resource instances to be used for the job; and
provide an indication of the resource acquisition plan to the client.

2. The system as recited in claim 1, wherein the recommended acquisition price comprises at least one of: a spot-market bid, an up-front payment for a resource instance reservation, a usage-based payment for a resource instance, or a payment for an on-demand resource instance.

3. The system as recited in claim 1, further comprising one or more computing devices configured to implement an interface manager operable to:
implement a programmatic interface allowing the client to specify at least one of: (a) the one or more computation steps or (b) the one or more instance data sources.

4. The system as recited in claim 1, wherein the resource planner is further operable to:
store a representation of the resource acquisition policy in a persistent repository;
provide access to a view of the representation to a second client; and
receive a second resource plan request from the second client comprising one or more job characteristics of a second job and an indication that the resource acquisition policy is to be used to obtain one or more resource instances of the plurality of resource instances to be used for the second job.

5. The system as recited in claim 1, wherein the resource planner is further operable to:
store a representation of an authorization setting of the resource acquisition policy in a persistent store, wherein the authorization setting identifies one or more entities authorized to access the resource acquisition policy, and one or more access permissions granted to each of the one or more entities.

6. The system as recited in claim 1, wherein the resource planner is further operable to:
in accordance with a recommendation automation request from the client, submit a request to acquire a particular resource instance at the recommended acquisition price.

7. A computer implemented method, comprising:
Receiving, by means of a processor, a plan request from a client, wherein the plan request comprises an indication of a resource acquisition policy to be used to obtain one or more resource instances of a plurality of resource instances of a provider network for a job, wherein the resource acquisition policy specifies one or more instance data sources; and generating, by means of a processor, a resource acquisition plan in accordance with the plan request based at least in part on an analysis of pricing data obtained from an instance data source of the one or more instance data sources, wherein the analysis comprises one or more computation steps indicated in the resource acquisition policy, and wherein the resource acquisition plan comprises at least one recommended acquisition price for a resource instance of the plurality of resource instances to be used for the job; and provide, by means of a processor, an indication of the resource acquisition plan.

8. The method as recited in claim 7, wherein the recommended acquisition price comprises at least one of: a spot-market bid, an up-front payment for a resource instance reservation, a usage-based payment for a resource instance, or a payment for an on-demand resource instance.

9. The method as recited in claim 7, further comprising:
implementing a programmatic interface allowing the client to specify at least one of: (a) the one or more computation steps or (b) the one or more instance data sources.

10. The method as recited in claim 7, further comprising:
storing a representation of the resource acquisition policy in a persistent repository;
providing access to a view of the representation to a second client; and
receiving a second resource plan request from the second client comprising an indication that the resource acquisition policy is to be used to obtain one or more resource instances of the plurality of resource instances to be used for a second job.

11. The method as recited in claim 7, further comprising:
storing a representation of an authorization setting of the resource acquisition policy in a persistent store, wherein the authorization setting identifies one or more entities authorized to access the resource acquisition policy, and one or more access permissions granted to each of the one or more entities.

12. The method as recited in claim 7, further comprising:
in accordance with a recommendation automation request from the client, submitting a request to acquire a particular resource instance at the recommended acquisition price.

13. The method as recited in claim 7, further comprising:
implementing a programmatic interface allowing the client to (a) view respective representations of a plurality of resource acquisition policies including one or more default resource acquisition policies generated by a resource planner without client input (b) select a different resource acquisition policy from the plurality of resource acquisition policies for a second plan request.

14. The method as recited in claim 13, wherein the programmatic interface allows the client to customize a particular resource acquisition policy of the plurality of resource acquisition policies by modifying one or more of: (a) an instance data source of the particular resource acquisition policy or (b) a computation step of the particular resource acquisition policy, further comprising:
in response to a policy modification request from the client, storing, in a persistent store, a version of the particular resource acquisition policy customized by the client in accordance with the programmatic interface.

15. The method as recited in claim 7, wherein the one or more computation steps comprise (a) a submission of the pricing data to a callback universal resource locator (URL) indicated by the client and (b) a reception of the recommended acquisition price in response to the submission.

16. A non-transitory computer-accessible storage medium storing program instructions that when executed on one or more processors:
receive a plan request from a client, wherein the plan request comprises an indication of a resource acquisition policy to be used to obtain one or more resource instances of a plurality of resource instances of a provider network for a job, wherein the resource acquisition policy specifies one or more instance data sources; and
provide, to the client, a resource acquisition plan in accordance with the plan request based at least in part on an analysis of pricing data obtained from an instance data source of the one or more instance data sources, wherein the resource acquisition plan comprises at least one recommended acquisition price for a resource instance of the plurality of resource instances to be used for the job.

17. The storage medium as recited in claim 16, wherein the recommended acquisition price comprises at least one of: a spot-market bid, an up-front payment for a resource instance reservation, a usage-based payment for a resource instance, or a payment for an on-demand resource instance.

18. The storage medium as recited in claim 16, wherein the instructions when executed on the one or more processors:
implement a programmatic interface allowing the client to specify at least one of: (a) one or more computation steps of the analysis of the pricing data or (b) the one or more instance data sources.

19. The storage medium as recited in claim 18, wherein the programmatic interface allows the client to specify the one or more computation steps using at least one of (a) an interpreted programming language or (b) a compilable programmable language.

20. The storage medium as recited in claim 18, wherein the programmatic interface allows the client to specify a property of a particular resource instance data source of the one or more resource instance data sources, wherein the property includes at least one of (a) a time period over which price variation for a specified type of resource instance is monitored or (b) an aggregation function to be applied to a collection of historical prices of resource instances of a particular type over a specified time period.

21. The storage medium as recited in claim 16, wherein the programmatic interface allows the client to specify one or more job objectives associated with the job, wherein a job objective of the one or more job objectives includes at least one of: (a) a minimization of job interruptions (b) a minimum job run time or (c) a minimization of a total cost of completing the job.

22. The storage medium as recited in claim 16, wherein the resource acquisition plan comprises at least one time-varying bid function indicating a bid value that changes over time for a particular type of resource instance.

23. The storage medium as recited in claim 16, wherein the instructions when executed on the one or more processors:
store a representation of the resource acquisition policy in a persistent repository;
provide access to a view of the representation to a second client; and
receive a second resource plan request from the second client comprising an indication that the resource acquisition policy is to be used to obtain one or more resource instances of the plurality of resource instances to be used for a second job.

24. The storage medium as recited in claim 23, wherein the instructions when executed on the one or more processors:
   implement a marketplace for resource acquisition policies, allowing the second client to determine a price associated with using the resource acquisition policy.

25. The storage medium as recited in claim 16, wherein the instructions when executed on the one or more processors:
   store a representation of an authorization setting of the resource acquisition policy in a persistent store, wherein the authorization setting identifies one or more entities authorized to access the resource acquisition policy, and one or more access permissions granted to each of the one or more entities.

* * * * *